United States Patent
Yang et al.

(10) Patent No.: US 11,411,489 B2
(45) Date of Patent: Aug. 9, 2022

(54) RESONANT HALF-BRIDGE FLYBACK POWER CONVERTER AND PRIMARY CONTROLLER CIRCUIT AND CONTROL METHOD THEREOF

(71) Applicant: RICHTEK TECHNOLOGY CORPORATION, Zhubei (TW)

(72) Inventors: Ta-Yung Yang, Taoyuan (TW); Kun-Yu Lin, Hsinchu (TW); Yu-Chang Chen, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 17/341,074

(22) Filed: Jun. 7, 2021

(65) Prior Publication Data
US 2021/0408921 A1 Dec. 30, 2021

Related U.S. Application Data

(60) Provisional application No. 63/045,817, filed on Jun. 29, 2020.

(30) Foreign Application Priority Data

Feb. 18, 2021 (TW) ................ 110105469

(51) Int. Cl.
*H02M 3/00* (2006.01)
*H02M 3/335* (2006.01)
*H02M 1/08* (2006.01)
*H02M 1/38* (2007.01)

(52) U.S. Cl.
CPC ............. *H02M 3/01* (2021.05); *H02M 1/083* (2013.01); *H02M 1/38* (2013.01); *H02M 3/33571* (2021.05); *H02M 3/33592* (2013.01)

(58) Field of Classification Search
CPC ............... H02M 3/01; H02M 3/33571; H02M 3/33582; H02M 1/083; H02M 1/38
See application file for complete search history.

(56) References Cited

U.S. PATENT DOCUMENTS

| | | | | |
|---|---|---|---|---|
| 5,353,212 A | * | 10/1994 | Loftus, Jr. ............. | H02M 3/337 363/127 |
| 5,959,850 A | | 9/1999 | Lim | |
| 2012/0033453 A1 | * | 2/2012 | Gong ...................... | H02M 3/01 363/21.02 |

(Continued)

*Primary Examiner* — Jue Zhang
(74) *Attorney, Agent, or Firm* — Tung & Associates

(57) ABSTRACT

A resonant half-bridge flyback power converter includes: a power transformer and a resonant capacitor which are coupled in series between a half-bridge power stage and an output power; and a primary controller circuit controlling a high side power switch and a low side power switch of the half-bridge power stage. When the high side switch is OFF, the control signal of the low side power switch includes a resonant switching pulse for achieving resonant switching of the low side switch and a soft switching pulse for achieving ZVS of the high side switch. When the output power is lower than a delay threshold, the primary controller circuit determines a delay period which is between the resonant switching pulse and the soft switching pulse to control both the high side power switch and the low side power switch to be OFF. The delay period is negatively correlated with the output power.

33 Claims, 10 Drawing Sheets

(56) References Cited

U.S. PATENT DOCUMENTS

2014/0003094 A1* 1/2014 Sorensen .......... H02M 3/33507
363/21.02
2021/0367501 A1* 11/2021 Huang .................... H02M 3/01

* cited by examiner

RESONANT HALF-BRIDGE FLYBACK POWER CONVERTER AND PRIMARY CONTROLLER CIRCUIT AND CONTROL METHOD THEREOF

CROSS REFERENCE

The present invention claims priority to U.S. 63/045817 filed on Jun. 29, 2020 and claims priority to TW 110105469 filed on Feb. 18, 2021.

BACKGROUND OF THE INVENTION

Field of Invention

The present invention relates to a flyback power converter; particularly, it relates to a resonant half-bridge flyback power converter. The present invention also relates to a primary controller circuit and a control method of such resonant half-bridge flyback power converter.

Description of Related Art

U.S. Pat. No. 5,959,850A "Asymmetrical duty cycle flyback converter" issued to Lim on Sep. 28, 1999 discloses a resonant half-bridge flyback power converter with zero voltage switching (ZVS) capability for improving power conversion efficiency. However, this prior art U.S. Pat. No. 5,959,850A has a drawback that this prior art is limited to operating in a continuous conduction mode (CCM) or in a boundary conduction mode (BCM); when this prior art operates in light load condition suffers, its power conversion efficiency is poor. In view of the above, the present invention provides a resonant half-bridge flyback power converter capable of operating in a discontinuous conduction mode (DCM). Further, through proper control of a low side power switch, the present invention is capable of enhancing power conversion efficiency in both heavy load condition and light load condition.

SUMMARY OF THE INVENTION

From one perspective, the present invention provides a resonant half-bridge flyback power converter, which is configured to operably convert an input power to an output power; the resonant half-bridge flyback power converter comprising: a half-bridge power stage including: a high side power switch and a low side power switch which are coupled in series between the input power and a reference voltage level, wherein the high side power switch and the low side power switch are commonly coupled to a phase node; a power transformer, which is coupled between the half-bridge power stage and the output power; a resonant capacitor, connected with a primary winding of the power transformer in series, wherein the resonant capacitor and the primary winding are coupled between the phase node and the input power; and a primary controller circuit, which is configured to operably generate a high side switching signal and a low side switching signal according to a feedback signal related to the output power, so as to respectively control the high side power switch and the low side power switch, thus controlling the primary winding of the power transformer to convert the input power to the output power; wherein the primary winding is magnetically energized when the high side power switch is ON, and wherein after the high side power switch is turned OFF, the primary controller circuit is configured to operably generate a resonant switching pulse within the low side switching signal, so as to turn ON the low side power switch, wherein energy obtained by the magnetic energization is delivered to a secondary winding of the power transformer from the resonant capacitor and the primary winding by resonant operation, so as to generate the output power; wherein in a case where the output power is lower than a delay threshold, the primary controller circuit is configured to operably determine a delay period, and wherein in a case where the delay period is longer than a light load threshold interval, during a part of the delay period after the light load threshold interval, the primary controller circuit is configured to operably control the high side power switch and the low side power switch to be both OFF, wherein the delay period is negatively correlated with the output power.

In one embodiment, in a case where the delay period is longer than the light load threshold interval, after the delay period ends, the primary controller circuit is further configured to operably generate a soft switching pulse within the low side switching signal, so as to turn ON the low side power switch for a soft switching period, so that the high side power switch achieves soft switching when the high side power switch is once again turned ON in a next cycle.

In one embodiment, the soft switching corresponds to a situation where the high side power switch achieves zero voltage switching (ZVS) when the high side power switch is once again turned ON in a next cycle.

In one embodiment, an ON period of the low side power switch is correlated with a demagnetization period of the power transformer, and wherein the ON period of the low side power switch is greater than or equal to the demagnetization period of the power transformer.

In one embodiment, immediately before and after an ON period of the high side switching signal, the high side switching signal is kept at low level for a high side dead time and the low side switching signal is kept at low level for a low side dead time, so that the high side power switch and the low side power switch achieve soft switching when the high side power switch and the low side power switch are once again turned ON in a next cycle, wherein the high side power switch is OFF during the high side dead time and the low side power switch is OFF during the low side dead time.

In one embodiment, the low side switching signal is enabled at a time point before the high side switching signal is enabled.

In one embodiment, before the high side power switch is turned ON, the low side power switch is controlled to be ON, so as to charge a bootstrap capacitor, wherein the bootstrap capacitor is configured to operably provide a power to a high side power switch driver, wherein the high side power switch driver is configured to operably drive the high side power switch.

In one embodiment, the light load threshold interval is greater than or equal to zero.

In one embodiment, the primary controller circuit is configured to operably determine the delay period further according to a waveform characteristic of a quasi-resonant signal, so as to determine an occurrence time point of the resonant switching pulse within the low side switching signal, wherein a quasi-resonant period of the quasi-resonant signal is correlated with an inductance of the primary winding and a stray capacitance of the half-bridge power stage.

In one embodiment, when the output power is lower than a burst threshold, a burst signal is generated, wherein under a situation where the burst signal is generated, the delay period further includes a burst period, which is configured to operably prolong the delay period.

In one embodiment, the burst threshold is lower than the delay threshold.

From another perspective, the present invention provides a primary controller circuit, which is configured to operably control a resonant half-bridge flyback power converter, so as to convert an input power to an output power, wherein the resonant half-bridge flyback power converter includes: a half-bridge power stage including: a high side power switch and a low side power switch which are coupled in series between the input power and a reference voltage level, wherein the high side power switch and the low side power switch are commonly coupled to a phase node; a power transformer, which is coupled between the half-bridge power stage and the output power; and a resonant capacitor, connected with a primary winding of the power transformer in series, wherein the resonant capacitor and the primary winding are coupled between the phase node and the input power; the primary controller circuit comprising: a pulse modulation circuit, which is configured to operably generate a modulation signal according to a feedback signal related to the output power; a high side driver circuit, which is configured to operably generate a high side switching signal according to the modulation signal, so as to control the high side power switch; and a time sequence control circuit, which is coupled to the pulse modulation circuit and which is configured to operably generate a low side switching signal for controlling the low side power switch, thus controlling a primary winding of the power transformer, so that the input power is converted to the output power; wherein the primary winding is magnetically energized when the high side power switch is ON, and wherein after the high side power switch is turned OFF, the primary controller circuit is configured to operably generate a resonant switching pulse within the low side switching signal, so as to turn ON the low side power switch, wherein energy obtained by the magnetic energization is delivered to a secondary winding of the power transformer from the resonant capacitor and the primary winding by resonant operation, so as to generate the output power; wherein in a case where the output power is lower than a delay threshold, the primary controller circuit is configured to operably determine a delay period, and wherein in a case where the delay period is longer than a light load threshold interval, during a part of the delay period after the light load threshold interval, the primary controller circuit is configured to operably control the high side power switch and the low side power switch to be both OFF, wherein the delay period is negatively correlated with the output power.

From yet another perspective, the present invention provides a control method, which is configured to operably control a resonant half-bridge flyback power converter, so as to convert an input power to an output power, wherein the resonant half-bridge flyback power converter includes: a half-bridge power stage including: a high side power switch and a low side power switch which are coupled in series between the input power and a reference voltage level, wherein the high side power switch and the low side power switch are commonly coupled to a phase node; a power transformer, which is coupled between the half-bridge power stage and the output power; and a resonant capacitor, connected with a primary winding of the power transformer in series, wherein the resonant capacitor and the primary winding are coupled between the phase node and the input power; the control method comprising: generating a modulation signal according to a feedback signal related to the output power; generating a high side switching signal and a low side switching signal according to the modulation signal, so as to control the high side power switch and the low side power switch, thus controlling a primary winding of the power transformer, so that the input power is converted to the output power; wherein the step to control the high side power switch and the low side power switch includes: after the high side power switch is turned OFF, generating a resonant switching pulse within the low side switching signal, so as to turn ON the low side power switch, wherein energy obtained from the magnetic energization is delivered to a secondary winding of the power transformer from the resonant capacitor and the primary winding by resonant operation, so as to generate the output power; wherein in a case where the output power is lower than a delay threshold, determining a delay period within the low side switching signal, and wherein in a case where the delay period is longer than a light load threshold interval, during a part of the delay period after the light load threshold interval, controlling the high side power switch and the low side power switch to be both OFF, wherein the delay period is negatively correlated with the output power.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
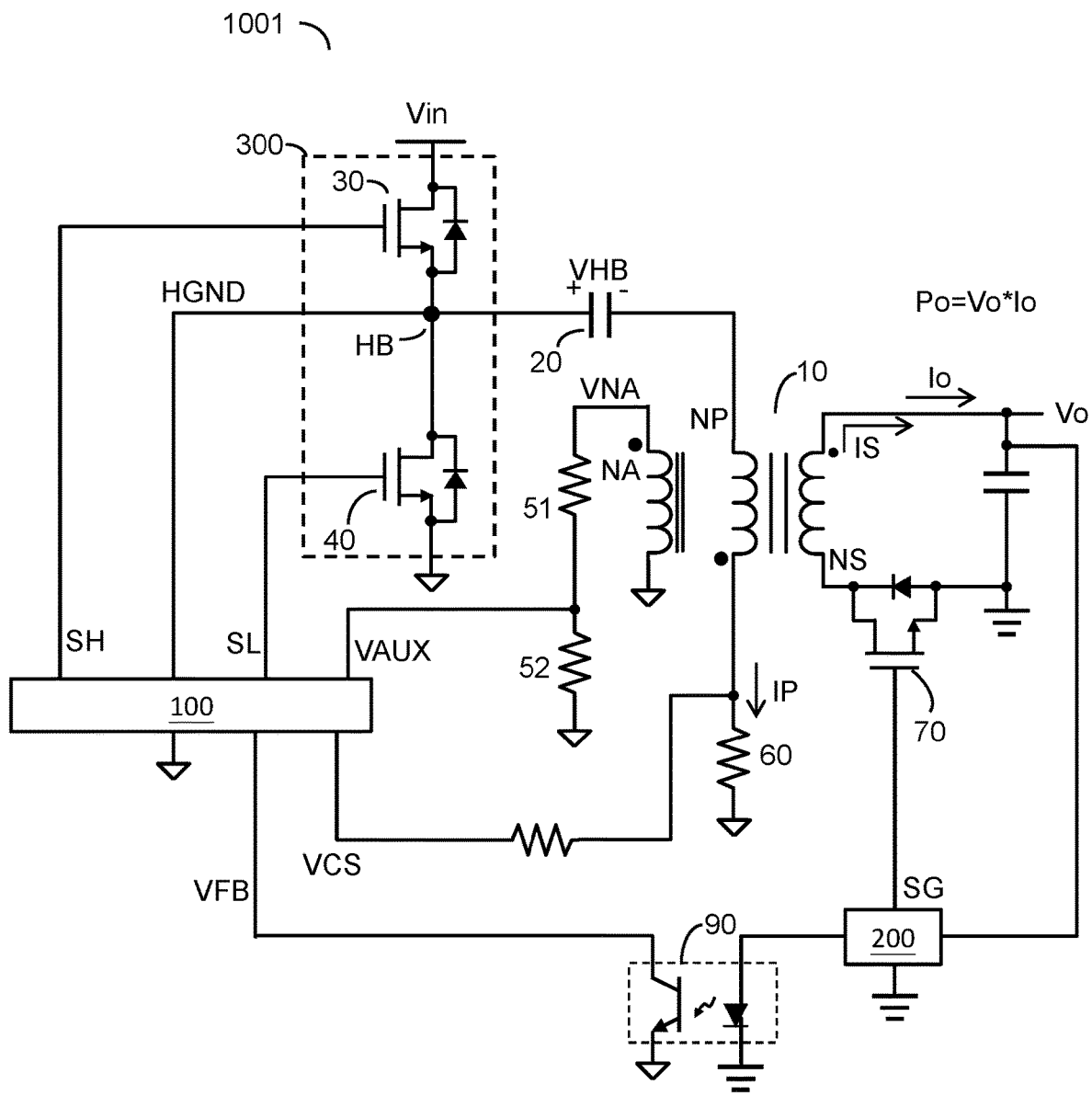
FIG. 1A shows a schematic diagram of a resonant half-bridge flyback power converter according to an embodiment of the present invention.

Please refer to FIG. 1A, which shows a schematic diagram of a resonant half-bridge flyback power converter (i.e., resonant half-bridge flyback power converter 1001) according to an embodiment of the present invention. The resonant half-bridge flyback power converter 1001 comprises: a half-bridge power stage 300, a power transformer 10, a resonant capacitor 20 and a primary controller circuit 100. The half-bridge power stage 300 includes a high side power switch 30 and a low side power switch which 40 are coupled in series between the input power Vin and a reference voltage level (i.e., a ground level). The resonant capacitor 20 and the power transformer 10 are connected in series, and the resonant capacitor 20 and the power transformer 10 are coupled between a phase node HB and the output power Po. The high side power switch 30 and the low side power switch 40 are commonly coupled to the phase node HB. The power transformer 10 includes: a primary winding NP, a secondary winding NS and an auxiliary winding NA. A turn ratio of the primary winding NP to the secondary winding NS is equal to n, whereas, a turn ratio of the secondary winding NS to the auxiliary winding NA is equal to m. The primary controller circuit 100 is configured to operably generate a high side switching signal SH and a low side switching signal SL, which are inputted to the half-bridge power stage 300 so that the half-bridge power stage 300 controls the power transformer 10 to generate the output power Po at a secondary side of the power transformer 10. To elaborate in more detail, the primary winding NP is energized when the high side power switch 30 is ON. And, after the high side power switch 30 is turned OFF, the primary controller circuit 100 generates a resonant switching pulse PRES (referring to FIG. 3) within the low side switching signal SL to turn ON the low side power switch 40; energy obtained from an operation of magnetic induction is delivered to the secondary winding NS of the power transformer 10 via the resonant capacitor 20 and the primary winding NP in a resonant operation, so as to generate the output power Po. A resistor 60 is configured to operably detect a primary side switch current IP, so as to generate a current detecting signal VCS.

In one embodiment, the primary controller circuit 100 is configured to operably generate the high side switching signal SH and the low side switching signal SL according to a feedback signal VFB. The feedback signal VFB is generated according to the output power Po of the resonant half-bridge flyback power converter 1001. To elaborate in more detail, in this embodiment, a secondary controller circuit 200 is coupled to the output power Po, for generating the feedback signal VFB according to the output power Po. In one embodiment, the feedback signal VFB is coupled to the primary controller circuit 100 via a photo-coupler 90. The secondary controller circuit 200 is further configured to operably generate a driving signal SG for controlling a synchronous rectification switch 70 during a demagnetization period TDS of the power transformer 10. The auxiliary winding NA generates an auxiliary winding signal VNA. Resistors 51 and 52 divide the auxiliary winding signal VNA to generate an auxiliary winding related signal VAUX.

Figure 1B:
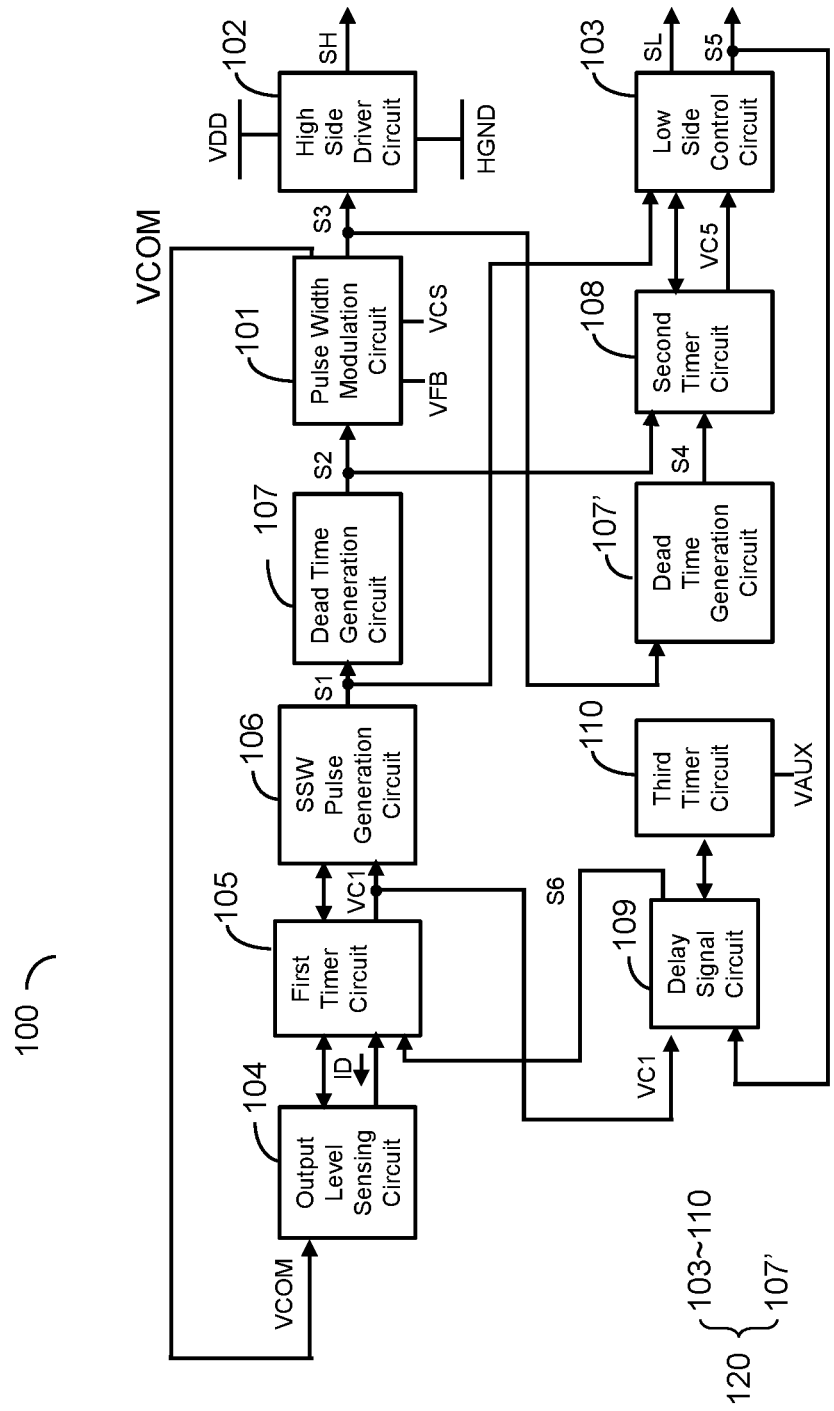
FIG. 1B shows a specific embodiment of a primary controller circuit in a resonant half-bridge flyback power converter.

Please refer to FIG. 1B, which shows a specific embodiment of a primary controller circuit (i.e., primary controller circuit 100) in a resonant half-bridge flyback power converter according to the present invention. As shown in FIG. 1B, in one embodiment, the primary controller circuit 100 includes: a pulse width modulation circuit 101, a high side driver circuit 102 and a time sequence control circuit 120. In one embodiment, the time sequence control circuit 120 includes: a first timer circuit 105, a soft switching (SSW) pulse generation circuit 106, a dead time generation circuit 107, a dead time generation circuit 107', a second timer circuit 108, a delay signal circuit 109, a third timer circuit 110 and an output level sensing circuit 104.

The first timer circuit 105 is configured to operably generate a ramp signal VC1 according to a discharging current ID related to the output power Po. The SSW pulse generation circuit 106 is configured to operably generate a signal Si corresponding to a soft switching pulse PSSW according to the ramp signal VC1. The dead time generation circuit 107 is configured to operably generate a signal S2 for providing a dead time between the switchings of the high side power switch 30 and the low side power switch 40. The pulse width modulation circuit 101 and the high side driver circuit 102 are configured to operably determine a pulse width of the high side switching signal SH according to for example the feedback signal VFB and a current sensing signal VCS. The dead time generation circuit 107' is configured to operably generate a signal S4 for providing a dead time between the switchings of the high side power switch 30 and the low side power switch 40. The second timer circuit 108 is configured to operably generate a ramp signal VC5 to the dead time determined by the signal S4. A low side control circuit 103 is configured to operably determine a pulse width of a signal S5 (corresponding to a resonant switching pulse PRES) according to the ramp signal VC5. Besides, the low side control circuit 103 is further configured to operably generate the low side switching signal SL according to a combination of the signal S1 and the signal S5. The third timer circuit 110 is configured to operably determine a time point (referred to as "occurrence time point" hereinafter) at which a valley occurs in a quasi-resonant signal according to the auxiliary winding related signal VAUX. The delay signal circuit 109 is configured to operably integrate the ramp signal VC1, the occurrence time point of the valley and the signal S5, to generate a signal S6 related to a delay period TDLY. The output level sensing circuit 104 is configured to operably determine the above-mentioned discharging current ID according to a feedback signal VCOM (corresponding to a level of an output current Io).

Figure 2:
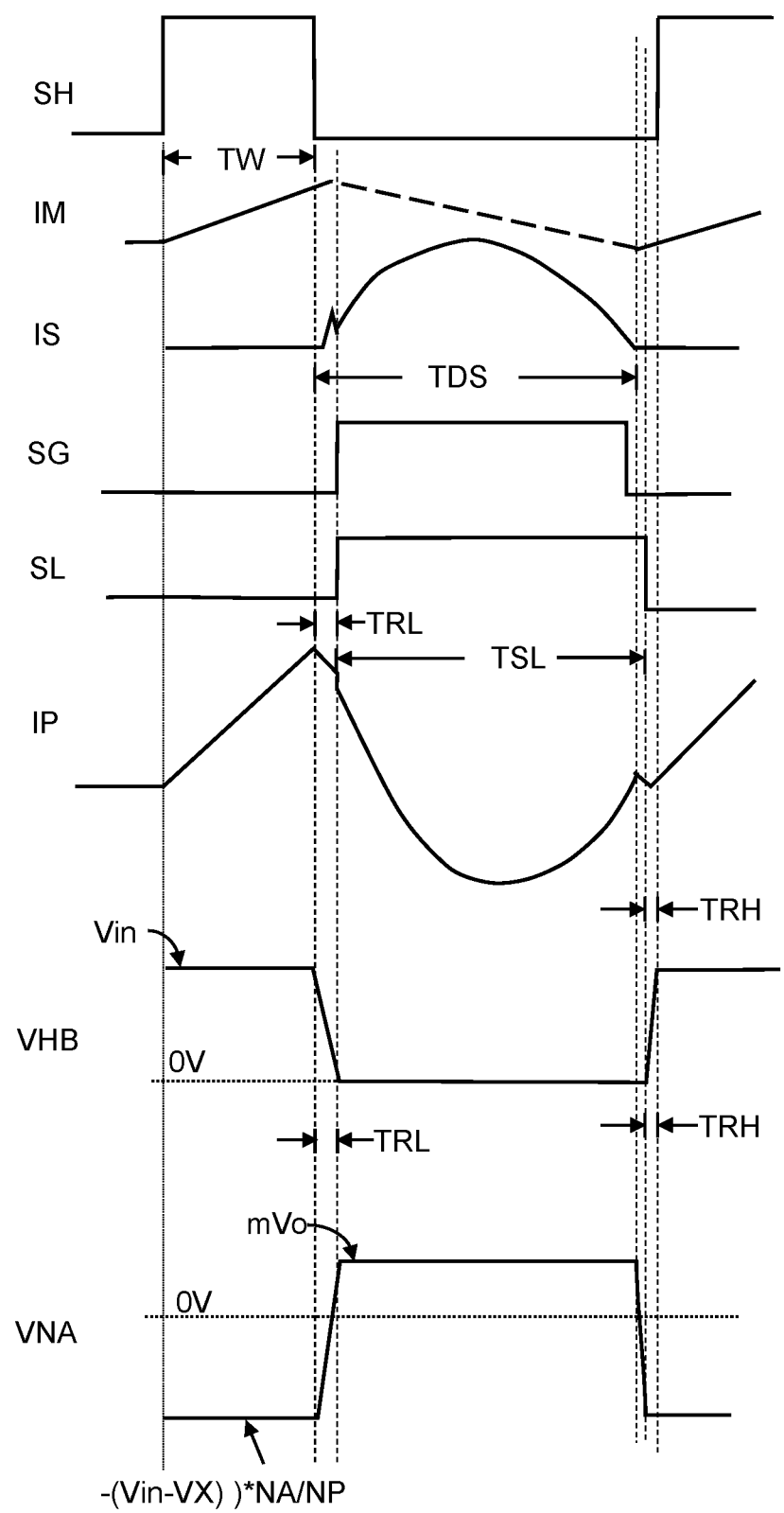
FIG. 2 illustrates a signal waveform diagram depicting the operation of a resonant half-bridge flyback power converter of FIG. 1A.

Please refer to FIG. 2, which illustrates a signal waveform diagram depicting the operation of a resonant half-bridge flyback power converter of FIG. 1A. When the high side switching signal SH is enabled (e.g., at high level), the power transformer 10 is magnetically energized to generate a magnetic induction current IM. An enablement period TW of the high side switching signal SH corresponds to an ON period of the high side power switch 30. On the other hand, when the high side switching signal SH is disabled (e.g., at low level), the power transformer 10 is demagnetized, to generate a secondary side switch current IS during the demagnetization period TDS of the power transformer 10. An enablement period TSL of the low side switching signal SL is correlated with the demagnetization period TDS of the power transformer 10, and the enablement period TSL of the low side switching signal SL corresponds to an ON period of the low side power switch 40. The enablement period TSL of the low side switching signal SL is equal to or longer than the demagnetization period TDS of the power transformer 10, so that the power transformer 10 does not operate in a continuous conduction mode (CCM). During the demagnetization period TDS of the power transformer 10, a reflected voltage VX is generated and is clamped within the resonant capacitor 20, wherein the reflected voltage VX can be expressed by following equation: VX=nVo.

After the high side switching signal SH is disabled (e.g., the high side switching signal SH is switched from high level to low level), the low side switching signal SL can be enabled. After the low side switching signal SL is disabled (e.g., the low side switching signal SL is switched from high level to low level), the high side switching signal SH can be enabled. A dead time (i.e., dead time TRH and/or dead time TRL) lies between the high side switching signal SH and the low side switching signal SL. The dead time TRH and the dead time TRL have a length that is correlated with the resonant period, so the high side power switch 30 and the low side power switch 40 can achieve soft switching, such as zero voltage switching (ZVS), when the high side power switch 30 and the low side power switch 40 is once again turned ON in a next cycle in the next cycle.

Figure 3:
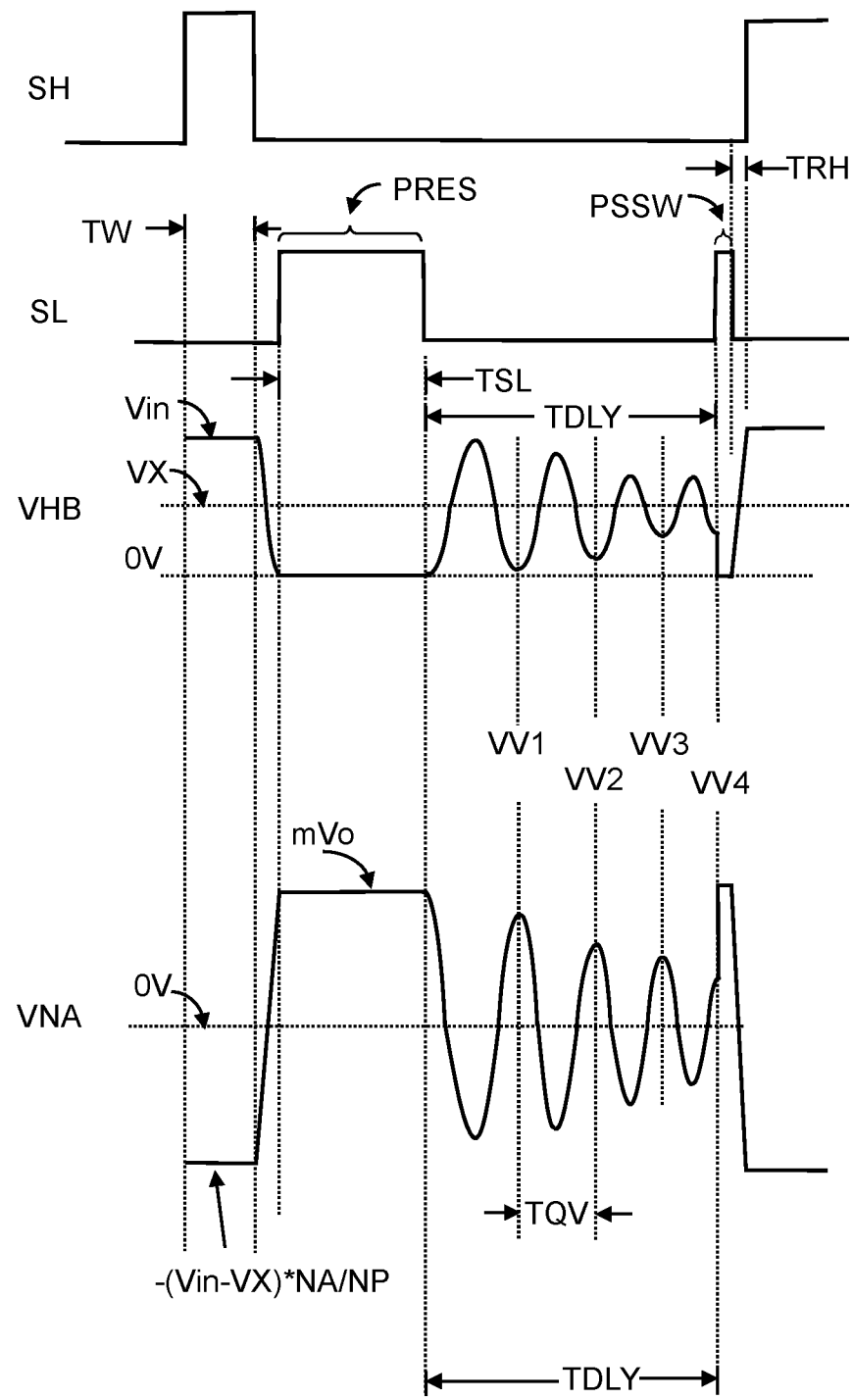
FIG. 3 illustrates a signal waveform diagram depicting the operation of a resonant half-bridge flyback power converter according to an embodiment of the present invention.

Please refer to FIG. 3, which illustrates a signal waveform diagram depicting the operation of a resonant half-bridge flyback power converter according to an embodiment of the present invention. In a case where the output power Po is lower than a delay threshold, the low side switching signal SL includes a delay period TDLY. When the output power Po is lower than the delay threshold, the delay period TDLY will be increased as the output power Po is decreased, and the frequency of the high side switching signal SH will be decreased as the output power Po is decreased. Note that "in a case where the output power Po is lower than a delay threshold", in one embodiment, can mean that a power level of the output power Po is lower than the delay threshold, whereas in another embodiment, can mean that a current level of the output power Po is lower than the delay threshold. The following description will use the case that the current level of the output power Po is lower than the delay threshold as an example.

As shown in FIG. 3, in one embodiment, in a case where the output power Po is lower than a delay threshold, the low side switching signal SL will include a resonant switching pulse PRES and a soft switching pulse PSSW, which are separate from each other. Besides, a delay period TDLY lies between the resonant switching pulse PRES and the soft switching pulse PSSW. As shown in FIG. 3, in one embodiment, during the delay period TDLY, the low side switching signal SL is disabled (i.e., the low side switching signal SL is at low level), whereby the low side power switch 40 is controlled to be OFF.

During the delay period TDLY, because the power transformer 10 has finished being demagnetized and because the high side power switch 30 and the low side power switch 40 are both OFF, a quasi-resonance will be formed by the power transformer 10 with a stray capacitance. It can be noticed that a quasi-resonant waveform appears in the waveform of the phase node voltage VHB or in the waveform of the auxiliary winding related signal VAUX. In one embodiment, the primary controller circuit 100 is configured to operably determine the delay period TDLY further according to an occurrence time point of a waveform characteristic (e.g., a valley) of a quasi-resonant signal, so as to enable the low side switching signal SL, thus achieving soft switching such as zero voltage switching (ZVS). The above-mentioned valley of the quasi-resonant signal can correspond to for example any one of the valleys VV1~VVN of the waveform of the phase node voltage VHB (wherein N denotes a positive integer). Or, the above-mentioned valley of the quasi-resonant signal can be a valley of a specific serial number in the valley sequence which is determined according to a level of the output power Po.

The low side switching signal SL turns ON the low side power switch 40 at the occurrence time point of the valley (e.g., valley VV4) in the quasi-resonant signal, so as to achieve soft switching such as zero voltage switching (ZVS) of the low side power switch 40, thus reducing the unwanted switching loss of the low side power switch 40. The quasi-resonant period TQV (a period between the occurrence time points of two neighboring valleys of the valleys VV1~VVN) of the quasi-resonant signal is correlated with an inductance of the primary winding NP of the power transformer 10 and a stray capacitance of the half-bridge power stage 300. The stray capacitance is related to the parasitic capacitances of the high side power switch 30, the low side power switch 40 and the power transformer 10.

Figure 4:
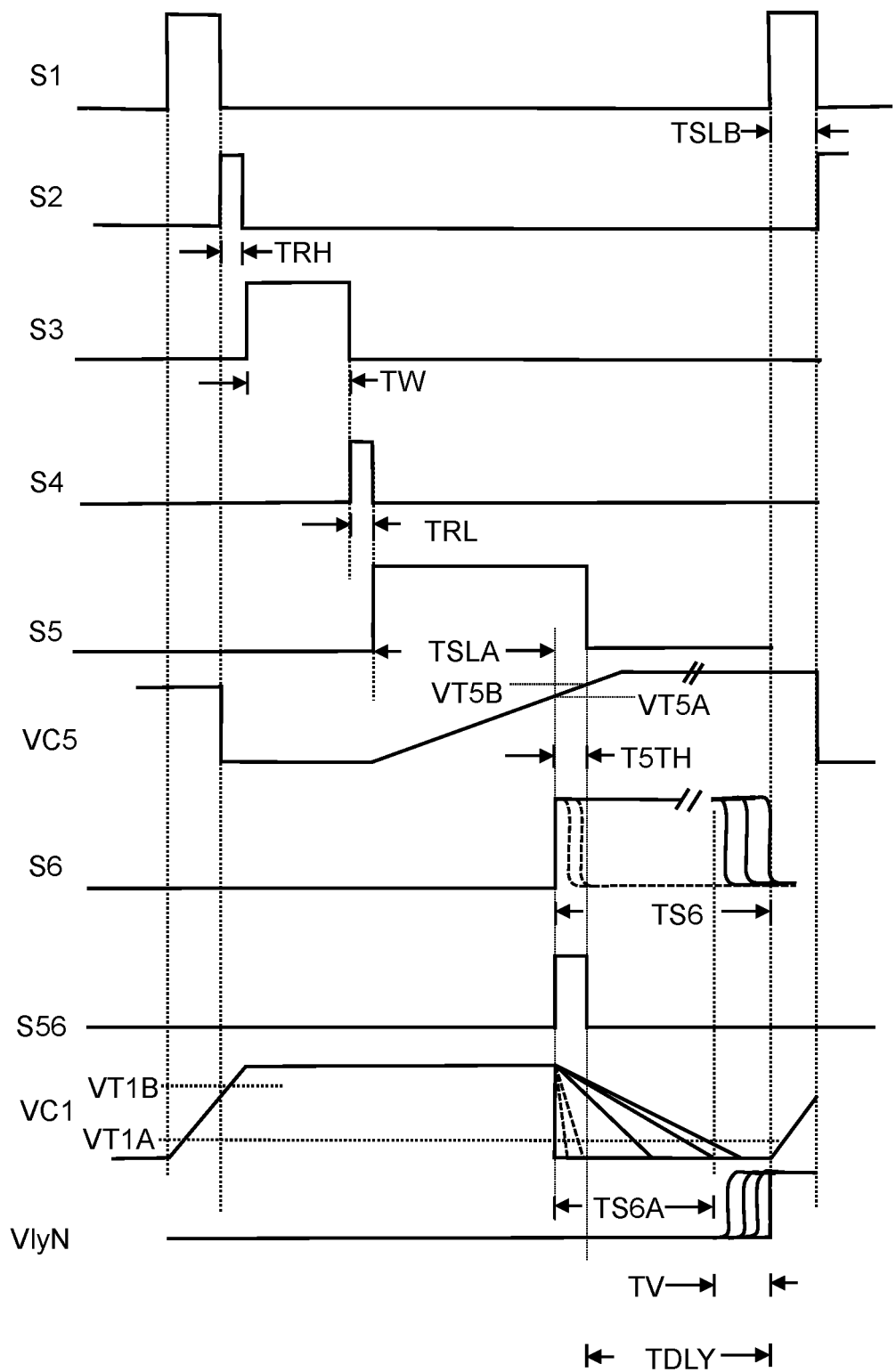
FIG. 4 illustrates a signal waveform diagram depicting the status operation of a resonant half-bridge flyback power converter according to an embodiment of the present invention.

Please refer to FIG. 4, which illustrates a signal waveform diagram depicting the status operation of a resonant half-bridge flyback power converter according to an embodiment of the present invention. The signal S1 and the signal S5 determine the low side switching signal SL. In one embodiment, the low side switching signal SL is generated by an OR logic operation on the signal S1 and the signal S5. The enablement period of the signal S1 corresponds to TSLB. The high side switching signal SH corresponds to the signal S3. In one embodiment, the pulse width of the signal S3 is correlated with a level of the feedback signal VFB and a level of the current sensing signal VCS. The pulse width of the signal S2 determines a dead time TRH, whereas, the pulse width of the signal S4 determines a dead time TRL. The pulse width TS6 of the signal S6 determines the delay period TDLY, the details of which will be described later. The pulse width TS6 of the signal S6 includes a first interval TS6A and a second interval TV.

As shown in FIG. 4, in one embodiment, the signal S1 is enabled before the signal S3 is enabled, so that the low side switching signal SL is enabled before the high side switching signal SH is enabled. As shown in FIG. 4, in one embodiment, the low side power switch 40 is turned ON before the high side power switch 30 is turned ON, so as to charge a bootstrap capacitor 277, wherein the bootstrap capacitor 277 is configured to operably provide a power to a high side power switch driver 275 (referring to FIG. 7, the details of which will be described later).

As shown in FIG. 4, in one embodiment, the signal S2 is enabled at an occurrence time point of a falling edge of the signal S1. Subsequently, the signal S3 is enabled at an occurrence time point of a falling edge of the signal S2. Subsequently, the signal S4 is enabled at an occurrence time point of a falling edge of the signal S3. Subsequently, the signal S5 is enabled at an occurrence time point of a falling edge of the signal S4.

Moreover, as shown in FIG. 4, in one embodiment, the signal S6 is enabled at an occurrence time point of a rising edge of a signal S56. The signal S56 is generated before the signal S5 ends. To elaborate in more detail, after the signal S5 is enabled, the signal S56 will be generated after an interval TSLA (i.e., the signal S56 will be generated at a time point where the ramp signal VC5 exceeds a threshold VT5A). Therefore, an overlapping interval T5TH exists between the start of the signal S6 and the end of the signal S5.

The ramp signal VC1 is configured to operably determine a switching period of the high side switching signal SH and a switching period of the low side switching signal SL. The charging period (as shown by a rising period in FIG. 4) of the ramp signal VC1 determines a pulse width of the signal S1. The discharging period (as shown by a falling period in FIG. 4) of the ramp signal VC1 determines the first interval TS6A of the signal S6. According to the present invention, in one embodiment, the discharging period of the ramp signal VC1 is negatively correlated with the output power Po (i.e., a level of the output current Io). In other words, as the level of the output current Io becomes lower, the first interval TS6A becomes longer. The second interval TV of the signal S6 is correlated with a period of the quasi-resonant signal and the order of the corresponding valley (i.e., VV1~VVN).

The ramp signal VC5 is configured to operably determine a pulse width of the signal S5 and is configured to operably generate the signal S56. The enablement of the signal S5 actuates a charging operation on the ramp signal VC5. That is, the ramp signal VC5 begins to rise up at an occurrence time point of the signal S5. When the ramp signal VC5 is greater than the threshold VT5A, the signal S56 is enabled. The signal S5 ends when the ramp signal VC5 is greater than the threshold VTSB, wherein the level of the threshold VTSB is higher than the level of the threshold VT5A.

In one embodiment, because the discharging period of the ramp signal VC1 is negatively correlated with the output power Po, in a situation where the output power Po of the resonant half-bridge flyback power converter 1001 is high (e.g. when a level of the output current Io is high) such that the discharging period of the ramp signal VC1 is shorter than the overlapping interval TSTH (e.g., as shown by several falling ramps illustrated as dashed lines in the waveform of the ramp signal VC1 in FIG. 4), the pulse width TS6 of the signal S6 will be shorter than the overlapping interval T5TH (e.g., as shown by several falling edges illustrated as dashed lines in the waveform of the signal S6 in FIG. 4). Under such situation, the signal S1 will overlap with the signal S5. Consequently, during the disablement period of the high side switching signal SH, the low side switching signal SL simply has one pulse (as shown in FIG. 2). In one embodiment, in a case where the discharging period of the ramp signal VC1 is shorter than the overlapping interval T5TH, the second interval TV will be disregarded, so that the pulse width TS6 of the signal S6 will be equal to the first interval TS6A.

On the other hand, in a situation where the output power Po of the resonant half-bridge flyback power converter 1001 is low such that the discharging period of the ramp signal VC1 is longer than the overlapping interval T5TH (e.g., as shown by several falling ramps illustrated as solid lines in the waveform of the ramp signal VC1 in FIG. 4), the low side switching signal SL will include a resonant switching pulse PRES and a soft switching pulse PSSW which are separate from each other (as shown in FIG. 3). The resonant switching pulse PRES corresponds to the signal S1, whereas, the soft switching pulse PSSW corresponds to the signal S5.

In this embodiment, the delay period TDLY starts at the falling edge of the signal S5, and the length of the delay period TDLY is correlated with the first interval TS6A. In one embodiment, the delay period TDLY further includes a second interval TV.

Because the pulse width TS6 of the signal S6 can be regarded as a precursor of the delay period TDLY, from one perspective, the pulse width TS6 of the signal S6 can be also regarded as a delay period (a delay period including the delay period TDLY). When the delay period TS6 is longer than a light load threshold interval (corresponding to the overlapping interval T5TH), during the delay period TDLY (which can be regarded as a part of the delay period TS6), both the high side power switch 30 and the low side power switch 40 are OFF. It is noteworthy that, in this embodiment, the delay period TS6 is equal to a sum of the light load threshold interval (corresponding to the overlapping interval T5TH) plus the delay period TDLY. In one embodiment, the light load threshold interval (corresponding to the overlapping interval T5TH) is greater than or equal to zero. In the case where the light load threshold interval (the overlapping interval T5TH) is equal to zero, the delay period TS6 overlaps with the delay period TDLY. In the case where the delay period TS6 is longer than the light load threshold interval (the overlapping interval T5TH), the delay period TDLY exists, i.e., the delay period TDLY is greater than zero in such case.

Besides, from one perspective, in one embodiment, the overlapping interval T5TH determines the above-mentioned light load threshold interval.

Please refer to FIGS. 5-10 in conjugation with FIG. 1B. FIG. 5 to FIG. 10 show schematic diagrams of specific embodiments corresponding to the circuit block diagrams shown in FIG. 1B. The primary controller circuit 100 in FIG. 1B is configured to operably execute the above-mentioned operations.

Figure 5:
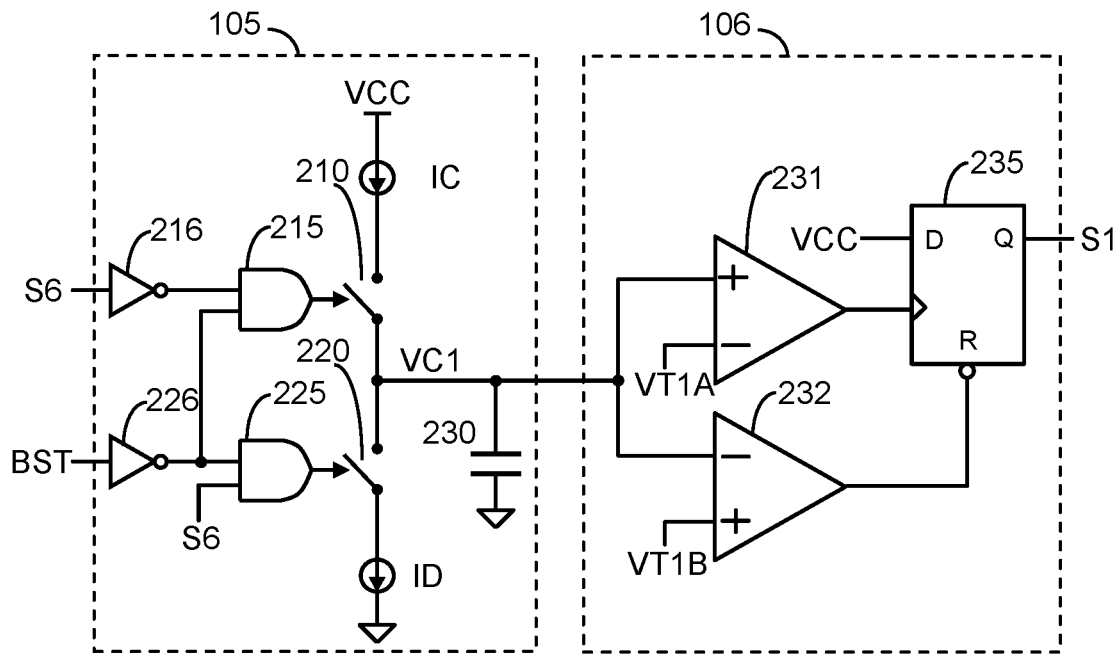
FIG. 5 shows a specific embodiment of a first timer circuit and a soft switching (SSW) pulse generation circuit in a primary controller circuit.

Please refer to FIG. 5, which shows a specific embodiment of a first timer circuit (i.e., first timer circuit 105) and a soft switching (SSW) pulse generation circuit (i.e., SSW pulse generation circuit 106) in a primary controller circuit according to the present invention. Please refer to FIG. 5 along with FIG. 1B and FIG. 4. The first timer circuit 105 is configured to operably generate a ramp signal VC1. The SSW pulse generation circuit 106 is configured to operably generate a signal Si corresponding to a soft switching pulse PSSW. When the signal S6 is disabled, a charging current IC charges a capacitor 230 via a switch 210, so as to generate a rising ramp of the ramp signal VC1. When a level of the ramp signal VC1 is higher than a threshold VT1A, a comparator 231 enables the signal S1. When a level of the ramp signal VC1 is higher than a threshold VT1B, a comparator 232 resets the signal S1. The pulse width of the signal S1 is correlated with a required criterion for the high side power switch 30 to achieve soft switching such as zero voltage switching. Thus, the charging current IC, capacitance of the capacitor 230, the threshold VT1A and the threshold VT1B can be determined according to the above-mentioned required criterion.

Figure 10:
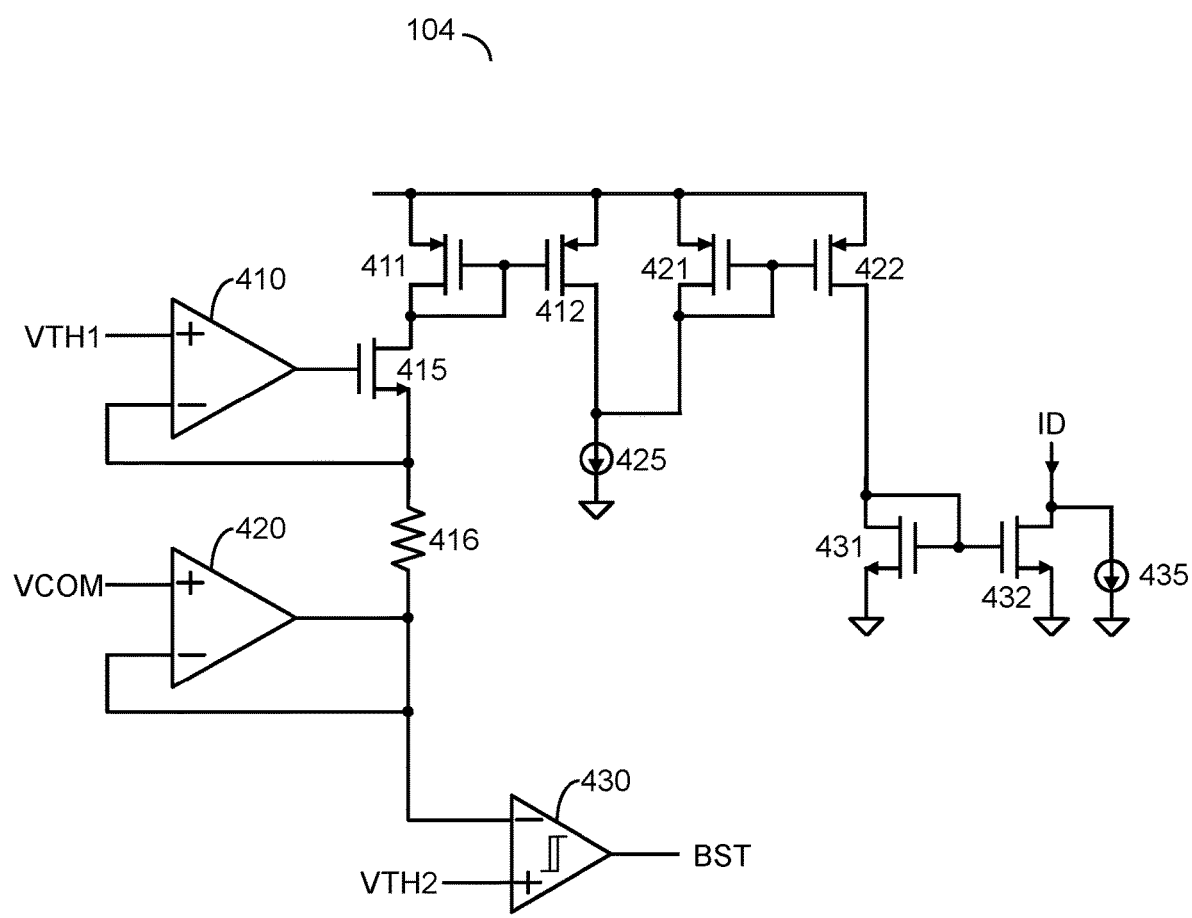
FIG. 10 shows a specific embodiment of an output level sensing circuit in a primary controller circuit.

When the signal S6 is enabled, a discharging current ID discharges the capacitor 230 via a switch 220. In one embodiment, when the feedback signal VCOM is lower than a threshold VTH1 (corresponding to a situation where the output power Po is lower than the delay threshold, as shown in FIG. 10, the details of which will be explained in more detail later), the discharging current ID is decreased as the output power Po is decreased. The level of the feedback signal VCOM is correlated with the level of the feedback signal VFB; in one embodiment, the level of the feedback signal VCOM and the level of the feedback signal VFB are both positively correlated with the level of the output current Io of the output power Po. When the feedback signal VCOM is lower than a threshold VTH2 (corresponding to a situation where the output power Po is lower than a burst threshold, as shown in FIG. 10, the details of which will be explained in more detail later), a burst signal BST is accordingly generated. In one embodiment, the level of the threshold VTH2 is lower than the level of the threshold VTH1. That is, the burst threshold is lower than the delay threshold. When the signal S6 is enabled, the burst signal BST will disable the switches 210 and 220 and will disable the charging and the discharging of the capacitor 230. Therefore, in a case where the burst signal BST is generated, the delay period TDLY further includes a burst period (i.e., a burst period lies within the delay period TDLY). Besides, the burst period will prolong the delay period TS6 as well as the delay period TDLY.

Figure 6:
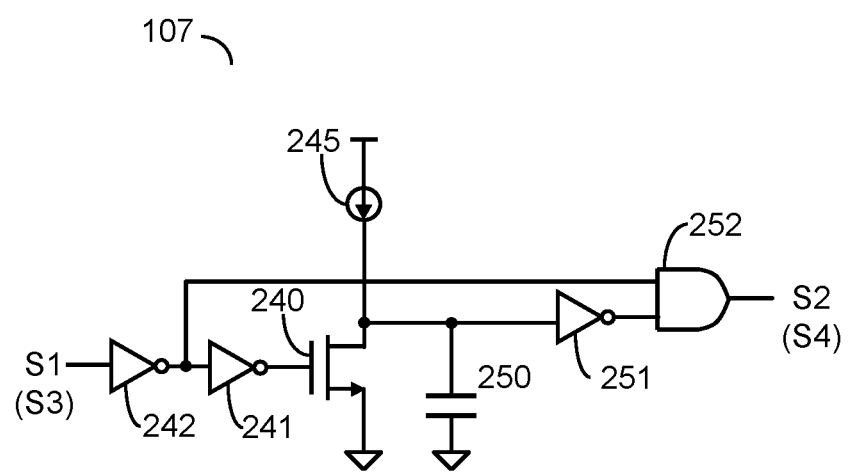
FIG. 6 shows a specific embodiment of a dead time generation circuit in a primary controller circuit.

Please refer to FIG. 6, which shows a specific embodiment of a dead time generation circuit (i.e., dead time generation circuit 107) in a primary controller circuit according to the present invention. The dead time generation circuit 107 shown in FIG. 6 can correspond to for example the dead time generation circuit 107 or the dead time generation circuit 107' shown in FIG. 1B. Please refer to FIG. 6 along with FIG. 1B and FIG. 4. The dead time generation circuit 107 is configured to operably generate the signal S2 having a pulse width equal to a dead time TRH, and generate the signal S4 having a pulse width equal to a dead time TRL. A current of a current source 245 and a capacitance of a capacitor 250 determine a time constant of the dead time generation circuit 107. In one embodiment, the time constant of the dead time generation circuit 107 is correlated with a resonant period caused by an inductor and a stray capacitor of the power transformer 10.

Figure 7:
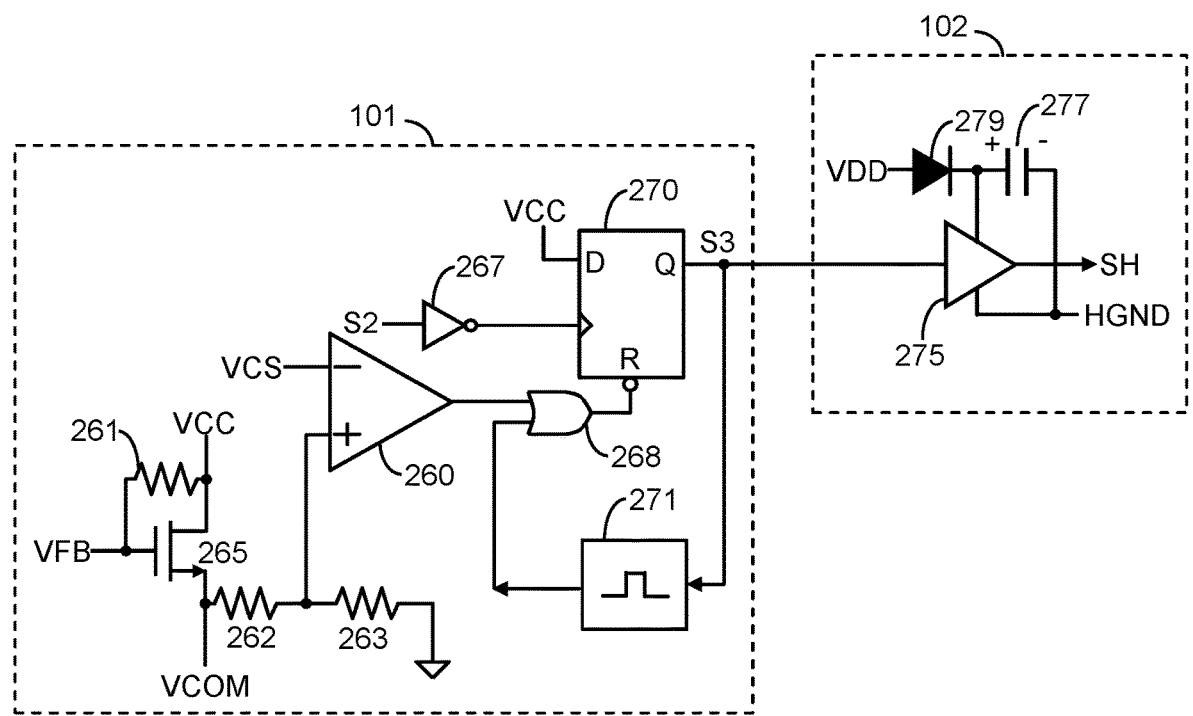
FIG. 7 shows a specific embodiment of a pulse width modulation circuit and a high side driver circuit in a primary controller circuit.

Please refer to FIG. 7, which shows a specific embodiment of a pulse width modulation circuit (i.e., pulse width modulation circuit 101) and a high side driver circuit (i.e., high side driver circuit 102) in a primary controller circuit according to the present invention. Please refer to FIG. 7 along with FIG. 1B and FIG. 4. The pulse width modulation circuit 101 is configured to operably generate the high side switching signal SH. The feedback signal VCOM is a level shifted signal generated according to the feedback signal VFB via a transistor 265. That is, the feedback signal VCOM is positively correlated with the feedback signal VFB, with a substantially constant difference between the feedback signal VCOM and the feedback signal VFB. The level of the feedback signal VFB is proportional to a level of the output power Po of the resonant half-bridge flyback power converter 1001. As described above, in one embodiment, the level of the feedback signal VFB is proportional to the level of the output current Io of the output power Po.

The signal S3 is enabled at an occurrence time point of a falling edge of the signal S2. After the signal S3 is enabled, a pulse generator 271 is configured to operably determine a minimum ON period for the signal S3. Resistors 262 and 263 are configured to operably divide the feedback signal VCOM (i.e., to generate a feedback signal VCOM'). When the current sensing signal VCS is higher than the feedback signal VCOM', a comparator 260 disables the signal S3.

In the high side driver circuit 102, the signal S3 is employed to generate a high side switching signal SH via a high side switch driver 275. Please refer to FIG. 7 along with FIG. 1A and FIG. 1B. When the low side power switch 40 is ON, a power supply VDD can charge a bootstrap capacitor 277 via a bootstrap diode 279, so as to provide a bootstrap type power to the high side switch driver 275 with reference to a bootstrap ground level HGND. The bootstrap ground level HGND is coupled to the above-mentioned phase node HB.

Figure 8:
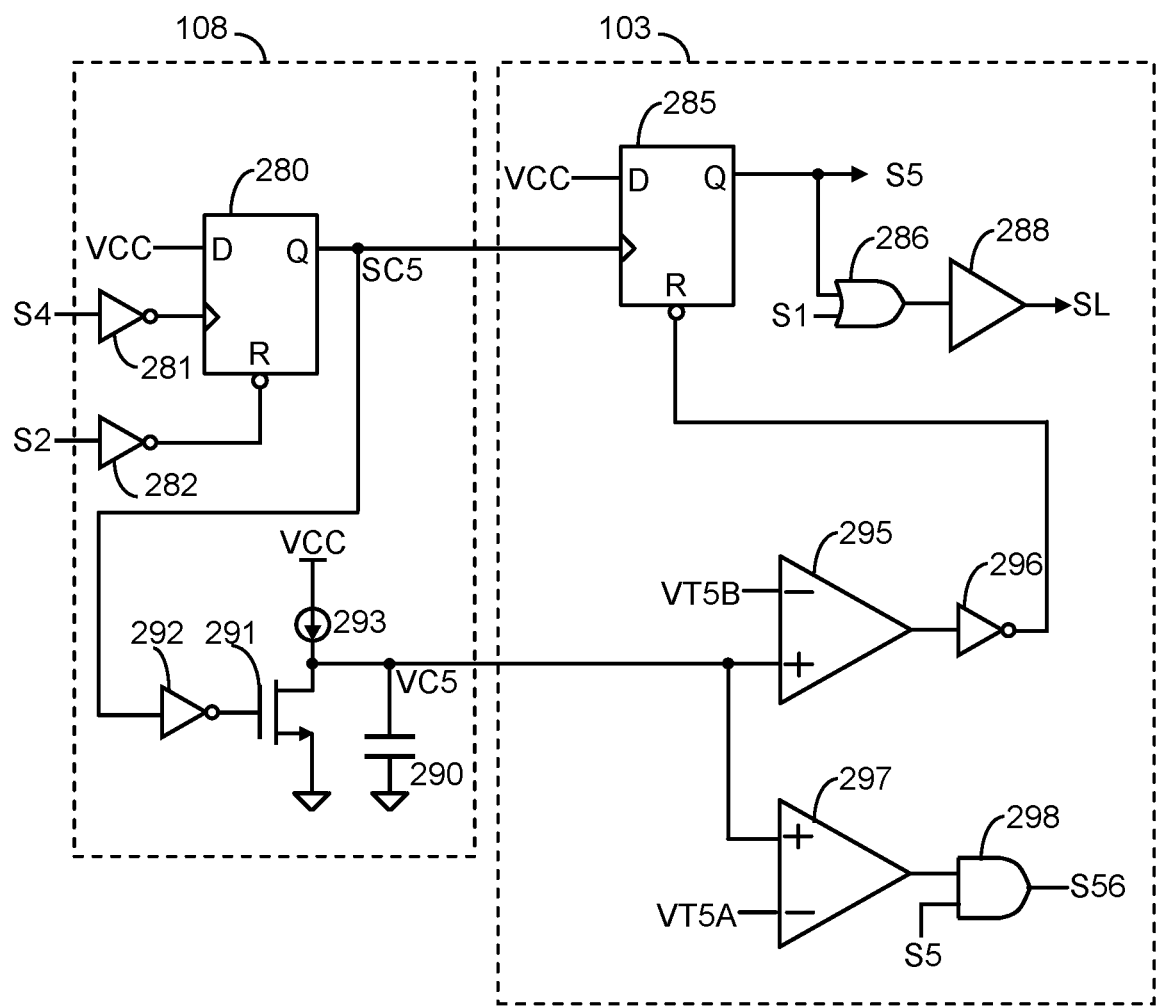
FIG. 8 shows a specific embodiment of a second timer circuit and a low side control circuit in a primary controller circuit.

Please refer to FIG. 8, which shows a specific embodiment of a second timer circuit (i.e., second timer circuit 108) and a low side control circuit (i.e., low side control circuit 103) in a primary controller circuit according to the present invention. Please refer to FIG. 8 along with FIG. 1B and FIG. 4. The second timer circuit 108 is configured to operably generate a ramp signal VC5. The low side control circuit 103 is configured to operably generate a signal S5 and a low side switching signal SL.

In the second timer circuit 108, a falling edge of the signal S4 turns OFF a switch 291 via logic circuits 281, 280 and 292, so that a current source 293 can charge a capacitor 290, thus generating a rising ramp of the ramp signal VC5. The signal S2 turns ON a switch 291 via logic circuits 282, 280 and 292, so as to reset the capacitor 290. To elaborate in more detail, in this embodiment, a flip-flop 280 is configured to operably generate a signal SC5 according to a falling edge of the signal S4. The enablement of the signal S2 resets the signal S5. The enablement of the signal S5 causes the capacitor 290 to begin its charging period. The current of a current source 293 and the capacitance of capacitor 290 determine a time constant, and this time constant is correlated with a demagnetization period TDS of the power transformer 10. In other words, an ON period of the low side power switch 40 is correlated with the demagnetization period TDS of the power transformer 10. When the ramp signal VC5 is greater than the threshold VTSA, a comparator 297 will generate a signal S56. When the ramp signal VC5 is greater than the threshold VT5B, a comparator 295 will reset the signal S5. The level of the threshold VT5B is higher than the level of the threshold 0VT5A. Referring to FIG. 4, the difference between the threshold VT5B and the threshold VT5A, along with a rising slope of the ramp signal VC5, determine a pulse width T5TH of the signal S56. In one embodiment, the pulse width T5TH corresponds to the above-mentioned light load threshold interval as well as the overlapping interval T5TH of the signals S5 and S6.

In the low side control circuit 103, the enablement of a signal SC5 enables the signal S5 via a flip-flop 285. The signal S5 and the signal S1 are employed to generate a low side switching signal SL via an OR gate 286 and a low side switch driver 288.

Figure 9:
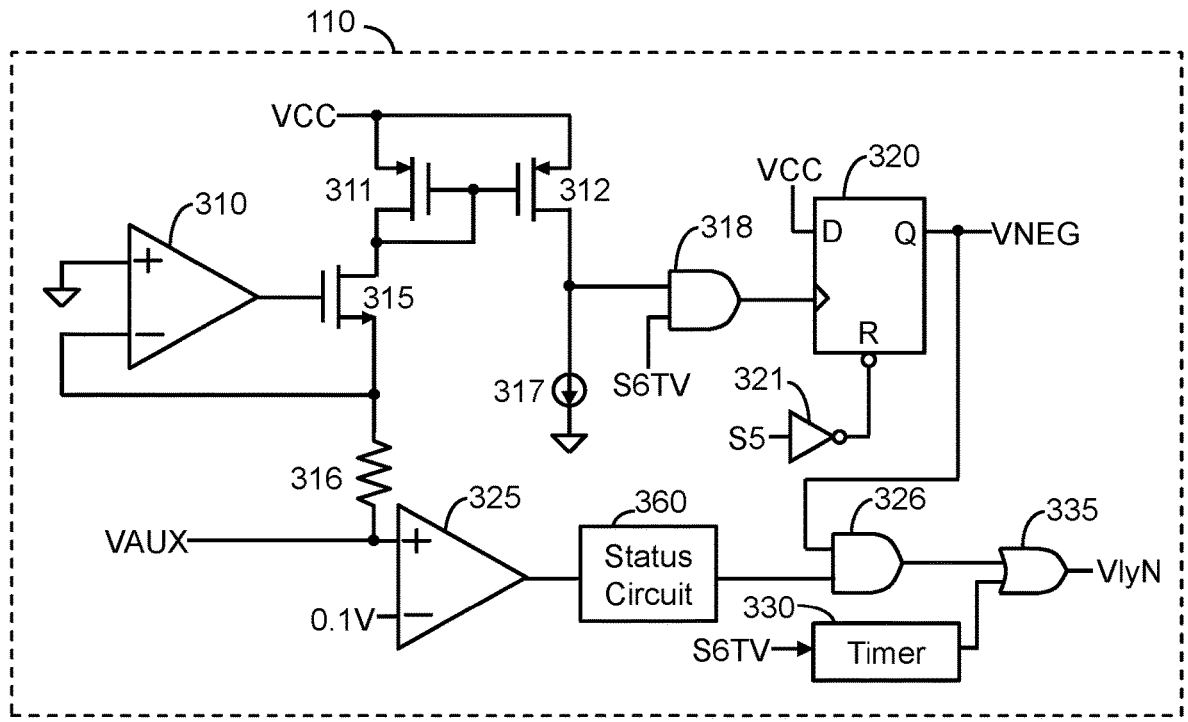
FIG. 9 shows a specific embodiment of a delay signal circuit and a third timer circuit in a primary controller circuit.
Figure 9:
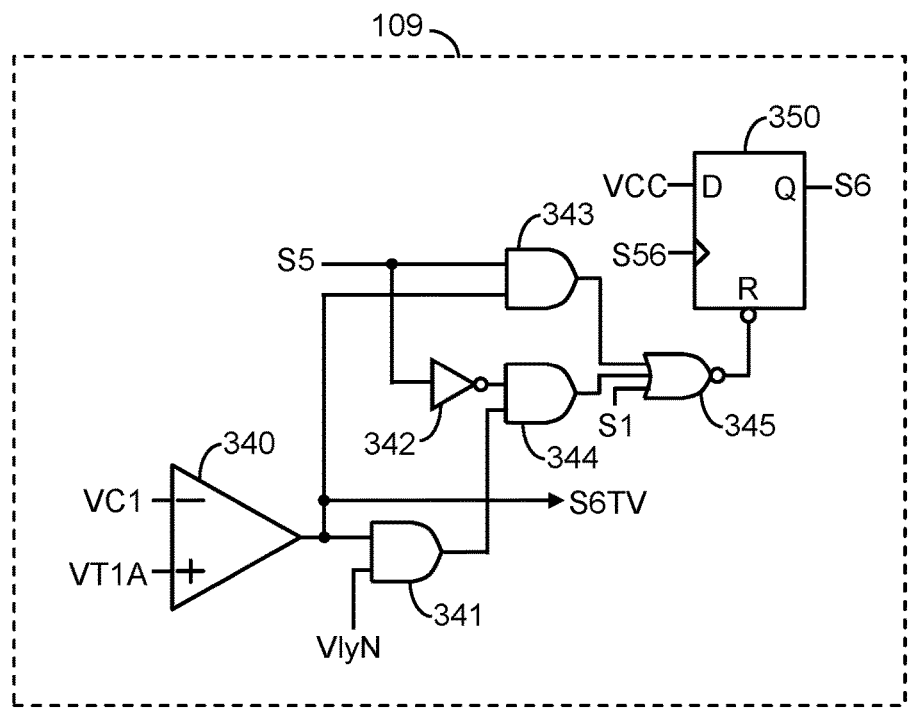

Please refer to FIG. 9, which shows a specific embodiment of a delay signal circuit (i.e., delay signal circuit 109) and a third timer circuit (i.e., third timer circuit 110) in a primary controller circuit according to the present invention. Please refer to FIG. 9 along with FIG. 1B and FIG. 4. The delay signal circuit 109 is configured to operably generate the delay signal S6. The third timer circuit 110 is configured to operably generate a signal VlyN.

In the delay signal circuit 109, the signal S56 is employed to enable the signal S6 via a flip-flop 350. In a case where the ramp signal VC1 is discharged to become lower than a threshold VT1A, a comparator 340 will generate a signal S6TV. The signal S6TV is configured to reset the signal S6 under following conditions and by the following appoaches: (1) if the signal S6TV is generated in a case where the signal S5 is in an enablement state, the signal S6TV will immediately reset the signal S6; (2) if the signal S6TV is generated in a case where the signal S5 is in a disablement state, the signal S6 will be reset until the signal S6TV and the signal VlyN are both enabled; or (3) the signal S6TV will actuate a timer 330 (referring to the third timer circuit 110 shown in FIG. 1B). If it is unable to detect a valley (e.g., VV1-VVN) in the waveform of the quasi-resonant signal, once the timer 330 reaches time-up, the timer 330 will enable the signal VlyN, thereby resetting the signal S6 by way of the above-mentioned approach (2). In other words, the timer 330 is configure to count overdue time. In FIG. 9, the circuits provided between the comparator 340 and a reset end of the flip-flop 350 are shown as an embodiment of a logic circuit configured to operably execute the above-mentioned operations.

In the third timer circuit 110, during a period where the signal S6TV is enabled, when the auxiliary winding signal VNA becomes a negative value, an operational amplifier 310, a resistor 316 and mirror transistors 311, 312 and 315 which are coupled to the auxiliary winding related signal VAUX generates a signal VNEG, indicating that the auxiliary winding signal VNA is negative. When the auxiliary winding related signal VAUX is higher than a positive threshold (e.g., 0.1V) and when the signal VNEG is enabled, a comparator 325 will generate the signal VlyN. In one embodiment, the signal VlyN is adopted to indicate an N-th valley in a waveform of the auxiliary winding signal VNA. It is worthwhile noting that, in the embodiment shown in FIG. 3, an optimal time point for turning ON the low side power switch 40 is a time point which is aligned with a peak (corresponding to a valley of VHB) in the waveform of the auxiliary winding signal VNA. Thus, in one preferred embodiment, in the third timer circuit 110, an appropriate delay circuit can be included in for example but not limited to a signal generation route for generating the signal VNEG, to delay by for example half of the quasi-resonant period TQV, so as to ensure a time point when the low side power switch 40 is turned ON is aligned with a peak in a waveform of the auxiliary winding signal VNA, for optimal efficacy.

In one embodiment, the third timer circuit 110 further includes a state circuit 360, which is configured to operably latch a comparison result of the comparator 325.

Please refer to FIG. 10, which shows a specific embodiment of an output level sensing circuit (i.e., output level sensing circuit 104) in a primary controller circuit according to the present invention. Please refer to FIG. 10 along with FIG. 1B, FIG. 4 and FIG. 5. The output level sensing circuit 104 is configured to operably generate a discharging current ID related to the output power Po, as well as a burst signal BST. A current source 425 is configured to operably determine a maximum of the discharging current ID, whereas, a current source 435 is configured to operably a minimum of the discharging current ID. When the feedback signal VCOM is lower than a threshold VTH1 (corresponding to a situation where the output power Po is lower than the delay threshold), operational amplifiers 410 and 420, a resistor 416 and a current control sub-circuit formed by mirror transistors 411, 412, 415, 421, 422, 431 and 432 will reduce a level of the discharging current ID as the feedback signal VCOM is decreased. As a consequence, a falling slope of the ramp signal VC1 will be decreased accordingly, thus prolonging the above-mentioned delay period.

Additionally, when the feedback signal VCOM is lower than a threshold VTH2 (corresponding to a situation where the output power Po is lower than a burst threshold), a comparator 430 will generate a burst signal BST accordingly. In one embodiment, the comparator 430 can be implemented as a hysteresis comparator.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant half-bridge flyback power converter, which is configured to operably convert an input power to an output power; the resonant half-bridge flyback power converter comprising:

a half-bridge power stage including: a high side power switch and a low side power switch which are coupled in series between the input power and a reference voltage level, wherein the high side power switch and the low side power switch are commonly coupled to a phase node;

a power transformer, which is coupled between the half-bridge power stage and the output power;

a resonant capacitor, connected with a primary winding of the power transformer in series, wherein the resonant capacitor and the primary winding are coupled between the phase node and the input power; and a primary controller circuit, which is configured to operably generate a high side switching signal and a low side switching signal according to a feedback signal related to the output power, so as to respectively control the high side power switch and the low side power switch, thus controlling the primary winding of the power transformer to convert the input power to the output power;

wherein the primary winding is magnetically energized when the high side power switch is ON, and wherein after the high side power switch is turned OFF, the primary controller circuit is configured to operably generate a resonant switching pulse within the low side switching signal, so as to turn ON the low side power switch, wherein energy obtained by the magnetic energization is delivered to a secondary winding of the power transformer from the resonant capacitor and the primary winding by resonant operation, so as to generate the output power;

wherein in a case where the output power is lower than a delay threshold, the primary controller circuit is configured to operably determine a delay period, and wherein in a case where the delay period is longer than a light load threshold interval, during a part of the delay period after the light load threshold interval, the primary controller circuit is configured to operably control the high side power switch and the low side power switch to be both OFF, wherein the delay period is negatively correlated with the output power.

2. The resonant half-bridge flyback power converter of claim 1, wherein in a case where the delay period is longer than the light load threshold interval, after the delay period ends, the primary controller circuit is further configured to operably generate a soft switching pulse within the low side switching signal, so as to turn ON the low side power switch for a soft switching period, so that the high side power switch achieves soft switching when the high side power switch is once again turned ON in a next cycle.

3. The resonant half-bridge flyback power converter of claim 2, wherein the soft switching corresponds to a situation where the high side power switch achieves zero voltage switching (ZVS) when the high side power switch is once again turned ON in a next cycle.

4. The resonant half-bridge flyback power converter of claim 1, wherein an ON period of the low side power switch is correlated with a demagnetization period of the power transformer, and wherein the ON period of the low side power switch is greater than or equal to the demagnetization period of the power transformer.

5. The resonant half-bridge flyback power converter of claim 1, wherein immediately before and after an ON period of the high side switching signal, the high side switching signal is kept at low level for a high side dead time and the low side switching signal is kept at low level for a low side dead time, so that the high side power switch and the low side power switch achieve soft switching when the high side power switch and the low side power switch are once again turned ON in a next cycle, wherein the high side power switch is OFF during the high side dead time and the low side power switch is OFF during the low side dead time.

6. The resonant half-bridge flyback power converter of claim 1, wherein the low side switching signal is enabled at a time point before the high side switching signal is enabled.

7. The resonant half-bridge flyback power converter of claim 1, wherein before the high side power switch is turned ON, the low side power switch is controlled to be ON, so as to charge a bootstrap capacitor, wherein the bootstrap capacitor is configured to operably provide a power to a high side power switch driver, wherein the high side power switch driver is configured to operably drive the high side power switch.

8. The resonant half-bridge flyback power converter of claim 1, wherein the light load threshold interval is greater than or equal to zero.

9. The resonant half-bridge flyback power converter of claim 1, wherein the primary controller circuit is configured to operably determine the delay period further according to a waveform characteristic of a quasi-resonant signal, so as to determine an occurrence time point of the resonant switching pulse within the low side switching signal, wherein a quasi-resonant period of the quasi-resonant signal is correlated with an inductance of the primary winding and a stray capacitance of the half-bridge power stage.

10. The resonant half-bridge flyback power converter of claim 1, wherein when the output power is lower than a burst threshold, a burst signal is generated, wherein under a situation where the burst signal is generated, the delay period further includes a burst period, which is configured to operably prolong the delay period.

11. The resonant half-bridge flyback power converter of claim 10, wherein the burst threshold is lower than the delay threshold.

12. A primary controller circuit, which is configured to operably control a resonant half-bridge flyback power converter, so as to convert an input power to an output power, wherein the resonant half-bridge flyback power converter includes: a half-bridge power stage, including: a high side power switch and a low side power switch which are coupled in series between the input power and a reference voltage level, wherein the high side power switch and the low side power switch are commonly coupled to a phase node; a power transformer, which is coupled between the half-bridge power stage and the output power; and a resonant capacitor, connected with a primary winding of the power transformer in series, wherein the resonant capacitor and the primary winding are coupled between the phase node and the input power; the primary controller circuit comprising:
- a pulse modulation circuit, which is configured to operably generate a modulation signal according to a feedback signal related to the output power;
- a high side driver circuit, which is configured to operably generate a high side switching signal according to the modulation signal, so as to control the high side power switch; and
- a time sequence control circuit, which is coupled to the pulse modulation circuit and which is configured to operably generate a low side switching signal for controlling the low side power switch, thus controlling a primary winding of the power transformer, so that the input power is converted to the output power;
- wherein the primary winding is magnetically energized when the high side power switch is ON, and wherein after the high side power switch is turned OFF, the primary controller circuit is configured to operably generate a resonant switching pulse within the low side switching signal, so as to turn ON the low side power switch, wherein energy obtained by the magnetic energization is delivered to a secondary winding of the power transformer from the resonant capacitor and the primary winding by resonant operation, so as to generate the output power;
- wherein in a case where the output power is lower than a delay threshold, the primary controller circuit is configured to operably determine a delay period, and wherein in a case where the delay period is longer than a light load threshold interval, during a part of the delay period after the light load threshold interval, the primary controller circuit is configured to operably control the high side power switch and the low side power switch to be both OFF, wherein the delay period is negatively correlated with the output power.

13. The primary controller circuit of claim 12, wherein in a case where the delay period is longer than the light load threshold interval, after the delay period ends, the primary controller circuit is further configured to operably generate a soft switching pulse within the low side switching signal, so as to turn ON the low side power switch for a soft switching period, so that the high side power switch achieves soft switching when the high side power switch is once again turned ON in a next cycle.

14. The primary controller circuit of claim 13, wherein the soft switching corresponds to a situation where the high side power switch achieves zero voltage switching (ZVS) when the high side power switch is once again turned ON in a next cycle.

15. The primary controller circuit of claim 12, wherein an ON period of the low side power switch is correlated with a demagnetization period of the power transformer, and wherein the ON period of the low side power switch is greater than or equal to the demagnetization period of the power transformer.

16. The primary controller circuit of claim 12, wherein immediately before and after an ON period of the high side switching signal, the high side switching signal is kept at low level for a high side dead time and the low side switching signal is kept at low level for a low side dead time, so that the high side power switch and the low side power switch achieve soft switching when the high side power switch and the low side power switch are once again turned ON in a next cycle, wherein the high side power switch is OFF during the high side dead time and the low side power switch is OFF during the low side dead time.

17. The primary controller circuit of claim 12, wherein the low side switching signal is enabled at a time point before the high side switching signal is enabled.

18. The primary controller circuit of claim 12, wherein before the high side power switch is turned ON, the low side power switch is controlled to be ON, so as to charge a bootstrap capacitor, wherein the bootstrap capacitor is configured to operably provide a power to a high side power switch driver, wherein the high side power switch driver is configured to operably drive the high side power switch.

19. The primary controller circuit of claim 12, wherein the light load threshold interval is greater than or equal to zero.

20. The primary controller circuit of claim 12, wherein the primary controller circuit is configured to operably determine the delay period further according to a waveform characteristic of a quasi-resonant signal, so as to determine an occurrence time point of the resonant switching pulse within the low side switching signal, wherein a quasi-resonant period of the quasi-resonant signal is correlated with an inductance of the primary winding and a stray capacitance of the half-bridge power stage.

21. The primary controller circuit of claim 12, wherein when the output power is lower than a burst threshold, a burst signal is generated, wherein under a situation where the burst signal is generated, the delay period further includes a burst period, which is configured to operably prolong the delay period.

22. The primary controller circuit of claim 21, wherein the burst threshold is lower than the delay threshold.

23. A control method, which is configured to operably control a resonant half-bridge flyback power converter, so as to convert an input power to an output power, wherein the resonant half-bridge flyback power converter includes: a half-bridge power stage, including: a high side power switch and a low side power switch which are coupled in series between the input power and a reference voltage level, wherein the high side power switch and the low side power switch are commonly coupled to a phase node; a power transformer, which is coupled between the half-bridge power stage and the output power; and a resonant capacitor, connected with a primary winding of the power transformer in series, wherein the resonant capacitor and the primary winding are coupled between the phase node and the input power; the control method comprising:
generating a modulation signal according to a feedback signal related to the output power;
generating a high side switching signal and a low side switching signal according to the modulation signal, so as to control the high side power switch and the low side power switch, thus controlling a primary winding of the power transformer, so that the input power is converted to the output power;
wherein the step to control the high side power switch and the low side power switch includes:
after the high side power switch is turned OFF, generating a resonant switching pulse within the low side switching signal, so as to turn ON the low side power switch, wherein energy obtained from the magnetic energization is delivered to a secondary winding of the power transformer from the resonant capacitor and the primary winding by resonant operation, so as to generate the output power;
wherein in a case where the output power is lower than a delay threshold, determining a delay period within the low side switching signal, and wherein in a case where the delay period is longer than a light load threshold interval, during a part of the delay period after the light load threshold interval, controlling the high side power switch and the low side power switch to be both OFF, wherein the delay period is negatively correlated with the output power.

24. The control method of claim 23, further comprising:
in a case where the delay period is longer than the light load threshold interval, after the delay period ends, generating a soft switching pulse within the low side switching signal, so as to turn ON the low side power switch for a soft switching period, so that the high side power switch achieves soft switching when the high side power switch is once again turned ON in a next cycle.

25. The control method of claim 24, wherein the soft switching corresponds to a situation where the high side power switch achieves zero voltage switching (ZVS) when the high side power switch is once again turned ON in a next cycle.

26. The control method of claim 23, wherein an ON period of the low side power switch is correlated with a demagnetization period of the power transformer, and wherein the ON period of the low side power switch is greater than or equal to the demagnetization period of the power transformer.

27. The control method of claim 23, wherein immediately before and after an ON period of the high side switching signal, the high side switching signal is kept at low level for a high side dead time and the low side switching signal is kept at low level for a low side dead time, so that the high side power switch and the low side power switch achieve soft switching when the high side power switch and the low side power switch are once again turned ON in a next cycle, wherein the high side power switch is OFF during the high side dead time and the low side power switch is OFF during the low side dead time.

28. The control method of claim 23, wherein the low side switching signal is enabled at a time point before the high side switching signal is enabled.

29. The control method of claim 23, wherein before the high side power switch is turned ON, the low side power switch is controlled to be ON, so as to charge a bootstrap capacitor, wherein the bootstrap capacitor is configured to operably provide a power to a high side power switch driver, wherein the high side power switch driver is configured to operably drive the high side power switch.

30. The control method of claim 23, wherein the light load threshold interval is greater than or equal to zero.

31. The control method of claim 23, further comprising:
determining the delay period further according to a waveform characteristic of a quasi-resonant signal, so as to determine an occurrence time point of the resonant switching pulse within the low side switching signal, wherein a quasi-resonant period of the quasi-resonant signal is correlated with an inductance of the primary winding and a stray capacitance of the half-bridge power stage.

32. The control method of claim 23, wherein when the output power is lower than a burst threshold, a burst signal is generated, wherein under a situation where the burst signal is generated, the delay period further includes a burst period, which is configured to operably prolong the delay period.

33. The control method of claim 32, wherein the burst threshold is lower than the delay threshold.

* * * * *